US012786027B2

(12) United States Patent
Chen et al.

(10) Patent No.: US 12,786,027 B2
(45) Date of Patent: Nov. 3, 2026

(54) APPARATUS, SYSTEM, AND METHOD OF COMMUNICATING A SHORT TRAINING FIELD (STF) OVER A MILLIMETERWAVE (MMWAVE) CHANNEL

(71) Applicant: INTEL CORPORATION, Santa Clara, CA (US)

(72) Inventors: Xiaogang Chen, Portland, OR (US); Qinghua Li, San Ramon, CA (US); Amir Rubin, Kiryat Ono (IL); Thomas J. Kenney, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 2 days.

(21) Appl. No.: 18/870,652

(22) PCT Filed: Jun. 30, 2022

(86) PCT No.: PCT/US2022/035626

§ 371 (c)(1),
(2) Date: Nov. 30, 2024

(87) PCT Pub. No.: WO2024/005810

PCT Pub. Date: Jan. 4, 2024

(65) Prior Publication Data

US 2025/0330360 A1 Oct. 23, 2025

(51) Int. Cl.

*H04L 27/26* (2006.01)
*H04L 5/00* (2006.01)
*H04L 25/03* (2006.01)

(52) U.S. Cl.

CPC ...... *H04L 27/26132* (2021.01); *H04L 5/0048* (2013.01); *H04L 25/03006* (2013.01); *H04L 2025/03815* (2013.01)

(58) Field of Classification Search

CPC ............. H04L 27/26132; H04L 5/0048; H04L 25/03003; H04L 2025/03815
See application file for complete search history.

(56) References Cited

U.S. PATENT DOCUMENTS 9,794,044 B2 * 10/2017 Sun ........................ H04W 72/04
9,867,082 B2 * 1/2018 Kenney ............... H04L 27/2601
(Continued)

FOREIGN PATENT DOCUMENTS

EP 3 599 747 A1 1/2020
WO 2019/014264 1/2019

OTHER PUBLICATIONS

International Search Report and the Written Opinion for International Application No. PCT/US2022/035626, mailed on Mar. 31, 2023, 10 pages.

(Continued)

*Primary Examiner* — Jaison Joseph
(74) *Attorney, Agent, or Firm* — Shichrur & Co.

(57) ABSTRACT

For example, a wireless communication device may be configured to generate a Short Training Field (STF) according to a millimeter Wave (mmWave) Physical layer (PHY) Protocol Data Unit (PPDU) format. For example, the STF may include a plurality of repetitions of an STF structure. For example, the STF structure may include a plurality of repetitions of a short training Orthogonal Frequency Division Multiplexing (OFDM) symbol, which may include a training sequence over a plurality of OFDM tones. For example, the wireless communication device may be configured to transmit an mm Wave PPDU including the STF according to the mmWave PPDU format over an mmWave wireless communication channel in an mmWave frequency band.

20 Claims, 11 Drawing Sheets

(56) References Cited

U.S. PATENT DOCUMENTS

| | | | | |
|---|---|---|---|---|
| 10,153,930 | B2 * | 12/2018 | Zhang | H04L 27/26136 |
| 11,190,396 | B1 * | 11/2021 | Cao | H04L 41/0803 |
| 2014/0334420 | A1 * | 11/2014 | You | H04L 27/2607 370/329 |
| 2015/0131527 | A1 * | 5/2015 | Kenney | H04L 27/2613 370/328 |
| 2017/0118315 | A1 * | 4/2017 | Sun | H04W 4/70 |
| 2018/0145811 | A1 * | 5/2018 | Park | H04L 69/323 |
| 2018/0367650 | A1 | 12/2018 | Motozuka et al. | |
| 2019/0044781 | A1 * | 2/2019 | Lomayev | H04L 27/2613 |
| 2019/0141723 | A1 | 5/2019 | Zhang et al. | |
| 2020/0235884 | A1 | 7/2020 | Park et al. | |
| 2021/0234603 | A1 * | 7/2021 | Oteri | H04B 7/0697 |
| 2021/0385688 | A1 * | 12/2021 | Liu | H04L 5/0048 |
| 2022/0103408 | A1 | 3/2022 | Park et al. | |
| 2022/0173853 | A1 * | 6/2022 | Park | H04L 5/0082 |
| 2023/0388986 | A1 * | 11/2023 | Yang | H04L 27/2603 |
| 2024/0137155 | A1 * | 4/2024 | Lim | H04L 1/0075 |
| 2025/0330360 | A1 * | 10/2025 | Chen | H04L 25/03006 |

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications, Amendment 2: Enhanced Throughput for Operations in License-exempt Bands above 45 GHz, IEEE Computer Society, IEEE Std 802.11ay™-2021 (Amendment to IEEE Std 802.11™-2020 as amended by IEEE Std 802.11ax™-2021), Approved Mar. 25, 2021, 768 pages.

Search Report for European Patent Application No. 22949635.1, mailed on Mar. 24, 2026, 8 pages.

* cited by examiner

APPARATUS, SYSTEM, AND METHOD OF COMMUNICATING A SHORT TRAINING FIELD (STF) OVER A MILLIMETERWAVE (MMWAVE) CHANNEL

TECHNICAL FIELD

Aspects described herein generally relate to communicating a Short Training Field (STF) over a millimeterWave (mmWave) channel.

BACKGROUND

Devices in a wireless communication system may be configured to communicate over a millimeterWave (mmWave) wireless communication channel. There is a need to provide a technical solution to support various types of communications over the mmWave wireless communication channel.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
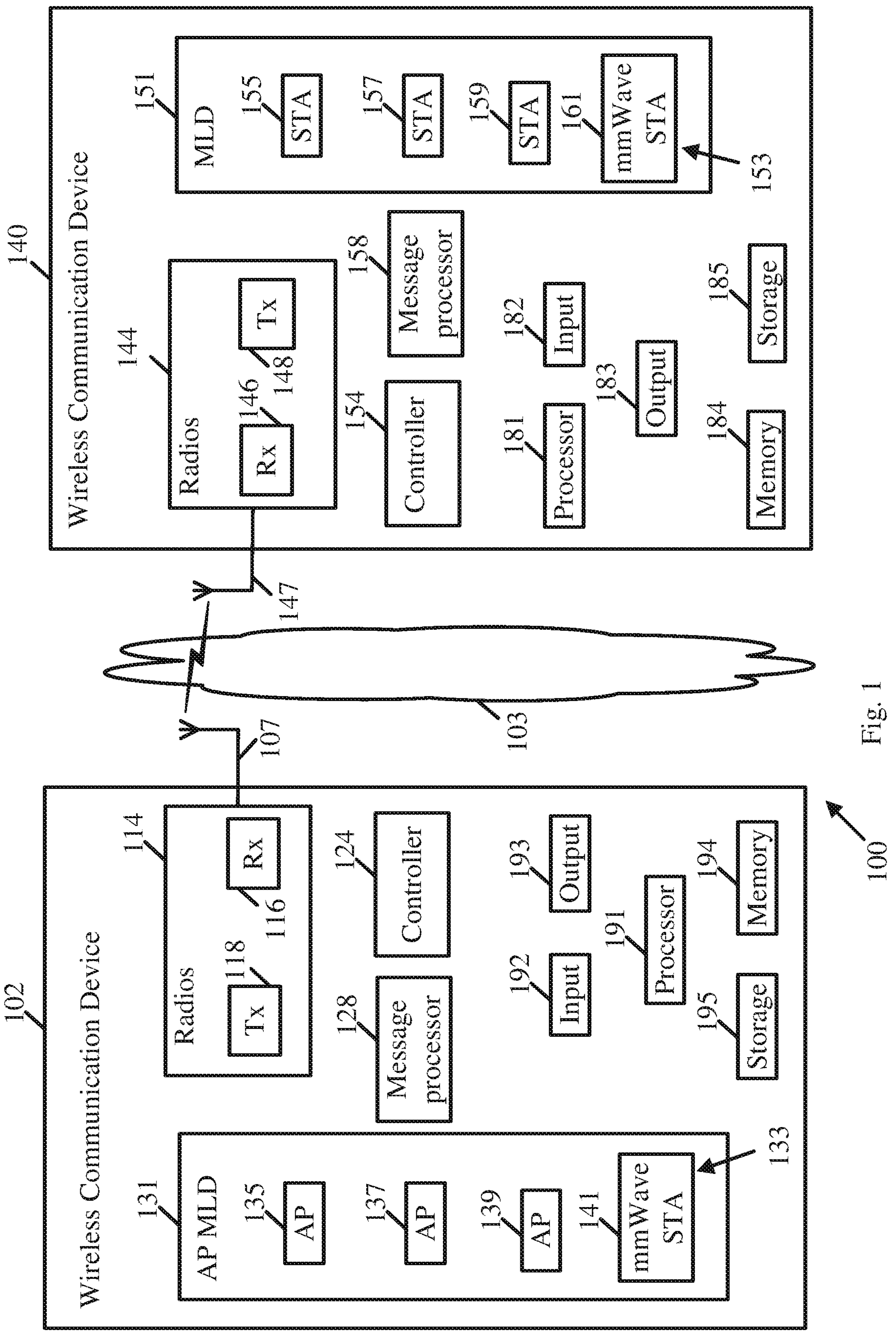
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, “processing”, “computing”, “calculating”, “determining”, “establishing”, “analyzing”, “checking”, or the like, may refer to operation(s) and/or process(es) of a computer, a computing platform, a computing system, or other electronic computing device, that manipulate and/or transform data represented as physical (e.g., electronic) quantities within the computer’s registers and/or memories into other data similarly represented as physical quantities within the computer’s registers and/or memories or other information storage medium that may store instructions to perform operations and/or processes.

The terms “plurality” and “a plurality”, as used herein, include, for example, “multiple” or “two or more”. For example, “a plurality of items” includes two or more items.

References to “one aspect”, “an aspect”, “demonstrative aspect”, “various aspects” etc., indicate that the aspect(s) so described may include a particular feature, structure, or characteristic, but not every aspect necessarily includes the particular feature, structure, or characteristic. Further, repeated use of the phrase “in one aspect” does not necessarily refer to the same aspect, although it may.

As used herein, unless otherwise specified the use of the ordinal adjectives “first”, “second”, “third” etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (IEEE 802.11-2020, IEEE Standard for Information Technology-Telecommunications and Information Exchange between Systems Local and Metropolitan Area Networks-Specific Requirements; Part 11: Wireless LAN Medium Access Control (MAC) and Physical Layer (PHY) Specifications, December 2020); and/or IEEE 802.11be (IEEE P802.11be/D1.5 Draft Standard for Information technology-Telecommunications and information exchange between systems Local and metropolitan area networks-Specific requirements; Part 11: Wireless LAN Medium Access Control (MAC) and Physical Layer (PHY) Specifications; Amendment 8: Enhancements for extremely high throughput (EHT), March 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBcc™. Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mm Wave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

Some demonstrative aspects may be implemented by a mm Wave STA (mSTA), which may include for example, a STA having a radio transmitter, which is capable of operating on a channel that is within the mmWave frequency band. In one example, mmWave communications may involve one or more directional links to communicate at a rate of multiple gigabits per second, for example, at least 1 Gigabit per second, e.g., at least 7 Gigabit per second, at least 30 Gigabit per second, or any other rate.

In some demonstrative aspects, the mmWave STA may include a Directional Multi-Gigabit (DMG) STA, which may be configured to communicate over a DMG frequency band. For example, the DMG band may include a frequency band wherein the channel starting frequency is above 45 GHZ.

In some demonstrative aspects, the mmWave STA may include an Enhanced DMG (EDMG) STA, which may be configured to implement one or more mechanisms, which may be configured to enable Single User (SU) and/or Multi-User (MU) communication of Downlink (DL) and/or Uplink frames (UL) using a MIMO scheme. For example, the EDMG STA may be configured to implement one or more channel bonding mechanisms, which may, for example, support communication over a channel bandwidth (BW) (also referred to as a "wide channel", an "EDMG channel", or a "bonded channel") including two or more channels, e.g., two or more 2.16 GHZ channels. For example, the channel bonding mechanisms may include, for example, a mechanism and/or an operation whereby two or more channels, e.g., 2.16 GHZ channels, can be combined, e.g., for a higher bandwidth of packet transmission, for example, to enable achieving higher data rates, e.g., when compared to transmissions over a single channel. Some demonstrative aspects are described herein with respect to communication over a channel BW including two or more 2.16 GHz channels, however other aspects may be implemented with respect to communications over a channel bandwidth, e.g., a "wide" channel, including or formed by any other number of two or more channels, for example, an aggregated channel including an aggregation of two or more channels. For example, the EDMG STA may be configured to implement one or more channel bonding mechanisms, which may, for example, support an increased channel bandwidth, for example, a channel BW of 4.32 GHz, a channel BW of 6.48 GHz, a channel BW of 8.64 GHZ, and/or any other additional or alternative channel BW. The EDMG STA may perform other additional or alternative functionality.

In other aspects, the mmWave STA may include any other type of STA and/or may perform other additional or alternative functionality. Other aspects may be implemented by any other apparatus, device and/or station.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102, and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140, and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a sub-10 Ghz band, for example, 2.4 GHz band, a 5 GHz band, a 6 GHz band, and/or any other sub-10 GHz band; and/or an mmWave band, e.g., a 45 Ghz band, a 60 Ghz band, and/or any other mmWave band; and/or any other band, e.g., a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include one or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB)

circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In some demonstrative aspects, device 102 and/or device 140 may include, operate as, perform the role of, and/or perform one or more functionalities of, one or more mmWave STAs, e.g., DMG STAs, EDMG STAs, and/or any other mmWave STA. For example, device 102 may include, operate as, perform the role of, and/or perform one or more functionalities of, one or more mmWave STAs, and/or device 140 may include, operate as, perform the role of, and/or perform one or more functionalities of, one or more mmWave STAs.

In other aspects, devices 102, and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured to operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more IEEE 802.11 Specifications, e.g., an IEEE 802.11-2020 Specification, an IEEE 802.11be Specification, an IEEE 802.11ay Specification and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to control, perform and/or to trigger, cause, instruct and/or control device 102 to operate as, perform a role of, and/or perform one or more operations and/or functionalities of, an AP MLD 131 including a plurality of STAs 133, e.g., including an AP STA 135, an AP STA 137, an AP STA 139, and/or an mmWave STA 141. In some aspects, as shown in FIG. 1, AP MLD 131 may include four STAs. In other aspects, AP MLD 131 may include any other number of STAs.

In one example, AP STA 135, AP STA 137, AP STA 139, and/or mmWave STA 141 may operate as, perform a role of, and/or perform one or more operations and/or functionalities of, an EHT AP STA. In other aspects, AP STA 135, AP STA 137, AP STA 139, and/or mmWave STA 141 may perform any other additional or alternative functionality.

In some demonstrative aspects, mmWave STA 141 may operate as, perform a role of, and/or perform one or more operations and/or functionalities of, a mmWave AP STA. In other aspects, mmWave STA 141 may operate as, perform a role of, and/or perform one or more operations and/or functionalities of an mmWave network controller to control communication over an mmWave wireless communication network.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, for example, the one or more radios 114 may include, for example, a radio for communication by mmWave STA 141 over a fourth wireless communication frequency channel and/or frequency band, e.g., an mmWave band, for example, a wireless communication band above 45 Ghz, for example, a 60 GHz band or any other mmWave band, e.g., as described below.

In some demonstrative aspects, the radios 114 utilized by STAs 133 may be implemented as separate radios. In other aspects, the radios 114 utilized by STAs 133 may be implemented by one or more shared and/or common radios and/or radio components.

In other aspects controller 124 may be configured to control, perform and/or to trigger, cause, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to control, perform and/or to trigger, cause, instruct and/or control device 140 to operate as, perform a role of, and/or perform one or more operations and/or functionalities of, an MLD 151 including a plurality of STAs 153, e.g., including a STA 155, a STA 157, a STA 159, and/or a STA 161. In some aspects, as shown in FIG. 1, MLD 151 may include four STAs. In other aspects, MLD 151 may include any other number of STAs.

In one example, STA 155, STA 157, STA 159, and/or STA 161 may operate as, perform a role of, and/or perform one or more operations and/or functionalities of, an EHT STA. In other aspects, STA 155, STA 157, STA 159, and/or STA 161 may perform any other additional or alternative functionality.

In some demonstrative aspects, STA 161 may be configured to operate as, perform a role of, and/or perform one or more operations and/or functionalities of, an mmWave STA, e.g., as described below. For example, the mmWave STA 161 may be configured to operate as, perform a role of, and/or perform one or more operations and/or functionalities of, a non-AP mmWave STA, e.g., as described below.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, for example, the one or more radios 144 may include, for example, a radio for communication by mmWave STA 161 over a fourth wireless communication frequency channel and/or frequency band, e.g., a mmWave band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to control, perform and/or to trigger, cause, instruct and/or control MLD 151 to operate as, perform a role of, and/or perform one or more operations and/or functionalities of, a non-AP MLD. For example, STA 155, STA 157, STA 159, and/or mmWave STA 161 may operate as, perform a role of, and/or perform one or more operations and/or functionalities of, a non-AP STA, e.g., a non-AP EHT STA.

In some demonstrative aspects, controller 154 may be configured to control, perform and/or to trigger, cause, instruct and/or control MLD 151 to operate as, perform a role of, and/or perform one or more operations and/or functionalities of, an AP MLD. For example, STA 155, STA 157, STA 159, and/or mmWave STA 161 may operate as, perform a role of, and/or perform one or more operations and/or functionalities of, an AP EHT STA.

In other aspects controller 154 may be configured to control, perform and/or to trigger, cause, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
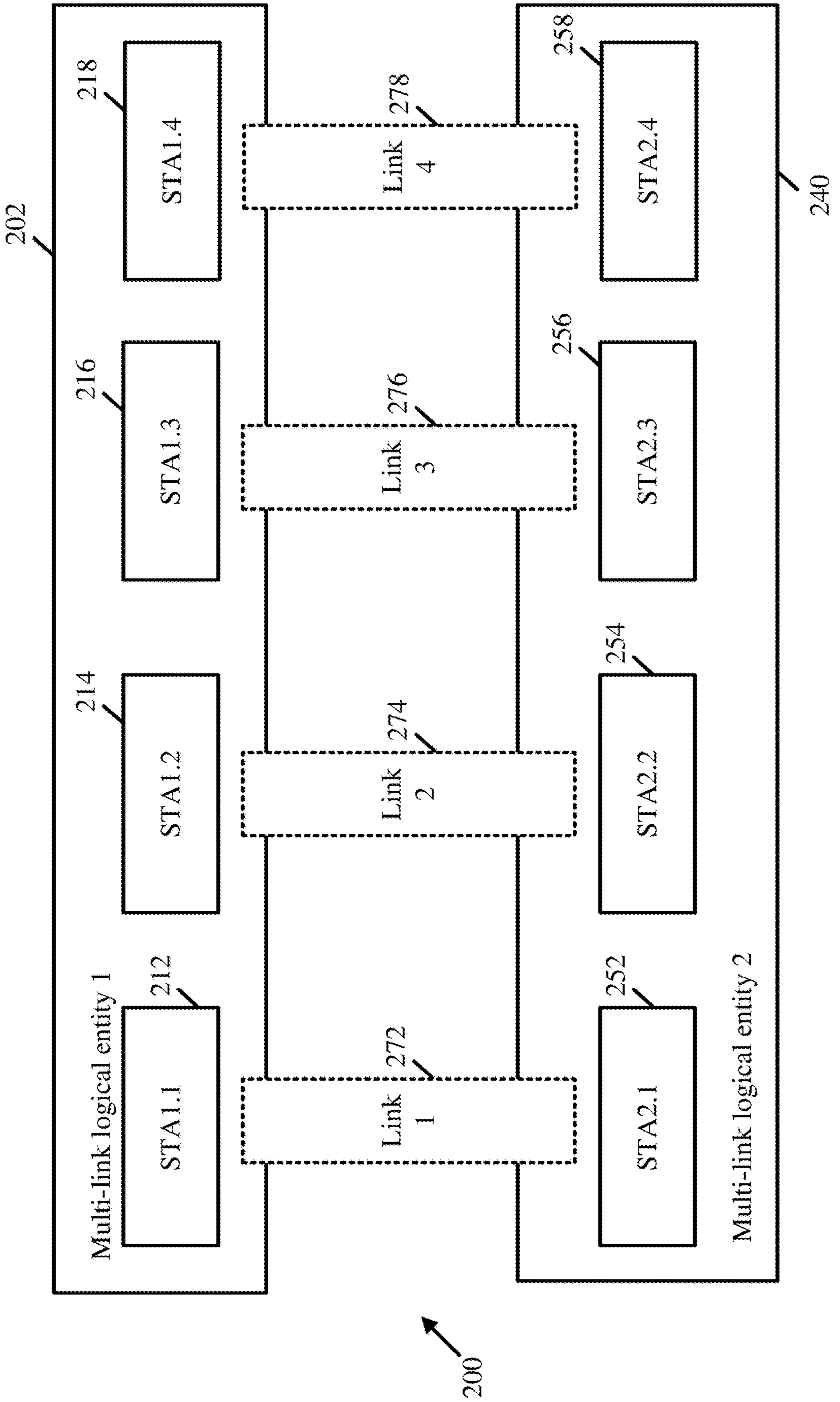
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, a STA 216, and a STA 218. In one example, AP MLD 131 (FIG. 1) may perform one or more operations of, one or more functionalities of, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, a STA 256, and a STA 258. In one example, MLD 151 (FIG. 1) may perform one or more operations of, one or more functionalities of, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, a link 276 between STA 216 and STA 256, and/or a link 278 between STA 218 and STA 258.

Figure 3:
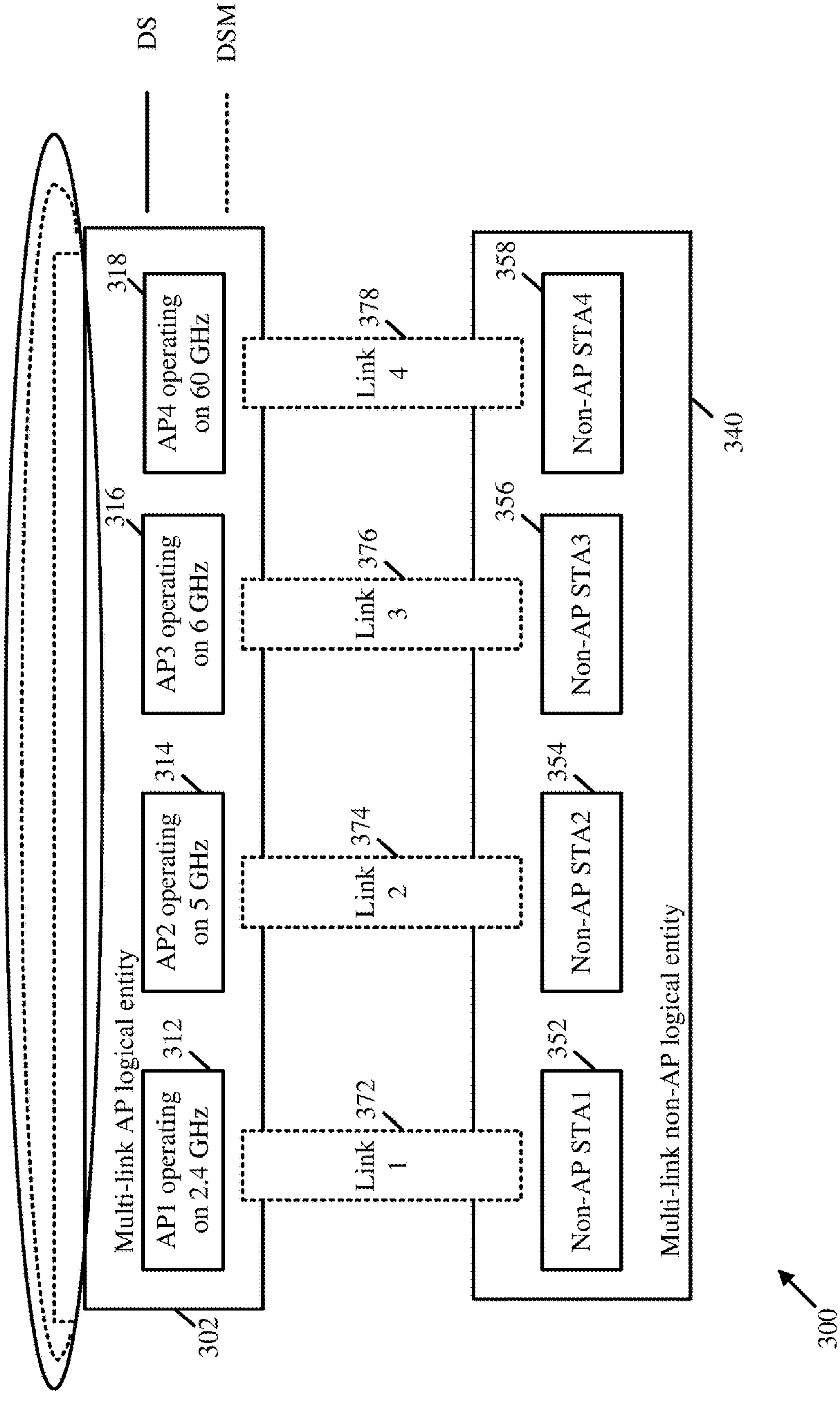
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, an AP STA 316, and an mmWave STA 318. In one example, AP MLD 131 (FIG. 1) may perform one or more operations of, one or more functionalities of, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, a non-AP STA 356, and an mmWave STA 358. In one example, MLD 151 (FIG. 1) may perform one or more operations of, one or more functionalities of, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, a link 376 between AP STA 316 and non-AP STA 356, and/or a link 378 between mmWave STA 318 and mmWave STA 358.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, AP STA 316 may be configured to communicate over a 6 Ghz frequency band, and/or mmWave STA 318 may be configured to communicate over a mmWave frequency band. In other aspects, AP STA 312, AP STA 314, AP STA 316, and/or mmWave STA 318 may be configured to communicate over any other additional or alternative wireless communication frequency bands.

Referring back to FIG. 1, in some demonstrative aspects, device 102 and/or device 140 may be configured to support a technical solution for communication between mmWave STAs, e.g., mmWave STA 141 and mmWave STA 161, over the mmWave frequency band, e.g., as described below.

In some demonstrative aspects, device 102 and/or device 140 may be configured to support a technical solution to generate, transmit, receive and/or process one or more packets configured according to a millimeterWave (mmWave) Physical layer (PHY) Protocol Data Unit (PPDU) format, which may be configured for communication over an mmWave wireless communication channel, e.g., as described below.

In some demonstrative aspects, device 102 and/or device 140 may be configured to support a technical solution to generate, transmit, receive and/or process one or more packets configured according to an mmWave PPDU format, which may utilize a Short Training Field (STF) design, which may be configured for communication over an mmWave wireless communication channel, e.g., as described below.

In some demonstrative aspects, the STF design may be configured to provide a technical solution to support packet acquisition, for example, for transmissions in a mmWave band, for example, in a 60 GHz band and/or any other mmWave frequency band, e.g., as described below.

In some demonstrative aspects, the STF design may be configured to provide a technical solution to support mmWave transceivers, e.g., 60 GHz transceivers, in mmWave communication. For example, mmWave transceivers, e.g., 60 GHz transceivers, may utilize a communication mode of ultralow rate, for example, to support mmWave communications, for example, even before beamforming training is performed and/or completed.

In some demonstrative aspects, a new mmWave PPDU format may be configured to provide a technical solution to support mmWave communications according to a low transmission rate mode, for example, an ultralow rate, e.g., as described below.

In some demonstrative aspects, the mmWave PPDU format may be configured to include an STF according to an STF design, which may be configured to support, for example, packet acquisition over the mmWave frequency band, e.g., as described below.

In some demonstrative aspects, the STF design may be configured according to an STF repetition scheme, which may be configured, for example, based on a plurality of repetitions of an STF structure, e.g., as described below.

In some demonstrative aspects, the STF repetition scheme may be configured to provide a technical solution to support improved and/or enhanced performance of packet acquisition, e.g., as described below.

In some demonstrative aspects, the STF repetition scheme may be configured based on a plurality of repetitions of the STF structure in a frequency domain, e.g., as described below.

In some demonstrative aspects, the STF repetition scheme may be configured based on a plurality of repetitions of the STF structure in a time domain, e.g., as described below.

In some demonstrative aspects, the STF repetition scheme may be configured based on a plurality of repetitions of the STF structure in a frequency domain and a time domain, e.g., as described below.

In other aspects, the STF repetition scheme may be configured based on any other additional or alternative repetitions of the STF structure.

In some demonstrative aspects, in some use cases, scenarios, and/or implementations, there may be one or more technical disadvantages and/or inefficiencies when implementing an STF based on a Single-Carrier (SC) scheme, e.g., as described below.

In one example, a preamble of a control mode (ultralow rate) transmission, e.g., according to an IEEE 802.11ad/ay Specification, may be defined according to a SC scheme, and may include an STF portion, which may be used for packet acquisition, Automatic Gain Control (AGC), frequency offset estimation, DC offset estimation, and/or other functionalities. For example, the STF portion of this control mode transmission may include a plurality of Golay sequences, and may have a duration of 6400*Tc~3.64 microseconds (us).

For example, an implementation using an STF according to a SC scheme may be inefficient, for example, as it may require implementation of dedicated SC functionalities and/or elements.

In some demonstrative aspects, an mmWave PPDU format may be configured according to an STF design, which may utilize an STF structure based on an Orthogonal Frequency Division Multiplexing (OFDM) scheme, e.g., as described below.

In some demonstrative aspects, the mmWave PPDU format may utilize an STF structure, which may be configured based on the OFDM scheme, e.g., as described below.

In some demonstrative aspects, the STF structure of the mmWave PPDU format may be based on a short training OFDM symbol, e.g., as described below.

In some demonstrative aspects, the STF structure of the mmWave PPDU format may be configured based on the OFDM scheme, for example, to provide a technical solution to support reuse of one or more elements and/or functionalities of an OFDM-based solution, for example, in compliance with a non High-Throughput (non-HT) STF (L-STF) definition, e.g., as described below.

For example, an L-STF definition, e.g., in accordance with an IEEE 802.11 Specification, may be based on an L-STF time-domain structure having a duration of 8 us and utilizing a short training OFDM symbol with a tone spacing of 312.5 kilohertz (kHz).

In some demonstrative aspects, controller 124 may be configured to control, cause and/or trigger an mmWave STA implemented by device 102, e.g., mmWave STA 141, to generate an STF according to an mmWave PPDU format, e.g., as described below.

In some demonstrative aspects, the STF may include a plurality of repetitions of an STF structure, e.g., as described below.

In some demonstrative aspects, the STF structure may include a plurality of repetitions of a short training OFDM symbol, e.g., as described below.

In some demonstrative aspects, the short training OFDM symbol may include a training sequence over a plurality of OFDM tones, e.g., as described below.

In some demonstrative aspects, controller 124 may be configured to control, cause and/or trigger the mmWave STA implemented by device 102, e.g., mmWave STA 141, to transmit an mmWave PPDU according to the mmWave PPDU format over an mmWave wireless communication channel in an mmWave frequency band, e.g., as described below.

In some demonstrative aspects, the mm Wave PPDU may include the STF, e.g., as described below.

In some demonstrative aspects, controller 154 may be configured to control, cause and/or trigger an mmWave STA implemented by device 140, e.g., mmWave STA 161, to process the receive an mmWave PPDU according to the mmWave PPDU format, and to process the STF of the mmWave PPDU. For example, controller 154 may be configured to control, cause and/or trigger an mmWave STA implemented by device 140, e.g., mmWave STA 161, to process the STF of the mmWave PPDU transmitted by device 102.

In some demonstrative aspects, controller 154 may be configured to control, cause and/or trigger the mmWave STA implemented by device 140, e.g., mmWave STA 161, to generate an STF according to the mmWave PPDU format, e.g., as described below.

In some demonstrative aspects, the STF may include a plurality of repetitions of an STF structure, e.g., as described below.

In some demonstrative aspects, the STF structure may include a plurality of repetitions of a short training OFDM symbol, e.g., as described below.

In some demonstrative aspects, the short training OFDM symbol may include a training sequence over a plurality of OFDM tones, e.g., as described below.

In some demonstrative aspects, controller 154 may be configured to control, cause and/or trigger the mmWave STA implemented by device 140, e.g., mmWave STA 161, to transmit an mmWave PPDU according to the mmWave PPDU format over an mmWave wireless communication channel in an mmWave frequency band, e.g., as described below.

In some demonstrative aspects, the mmWave PPDU may include the STF, e.g., as described below.

In some demonstrative aspects, controller 124 may be configured to control, cause and/or trigger the mmWave STA implemented by device 102, e.g., mmWave STA 141, to process the receive an mmWave PPDU according to the mmWave PPDU format, and to process the STF of the mmWave PPDU. For example, controller 124 may be configured to control, cause and/or trigger an mmWave STA implemented by device 102, e.g., mmWave STA 141, to process the STF of the mmWave PPDU transmitted by device 140.

In some demonstrative aspects, the mmWave frequency band may be above 45 GHz. In other aspects, any other mmWave band may be used.

In some demonstrative aspects, a bandwidth (BW) of the mmWave wireless communication channel may be equal to or greater than a minimal mmWave channel BW of at least 160 Megahertz (MHz), e.g., as described below. In other aspects, any other BW may be used.

In some demonstrative aspects, the STF structure of the mmWave PPDU format may be compatible with an L-STF structure, e.g., as described below.

In some demonstrative aspects, the STF structure of the mmWave PPDU format may include an L-STF structure, e.g., as described below.

In some demonstrative aspects, a duration of the STF structure of the mmWave PPDU format may be less than 5 microseconds, e.g., as described below.

In some demonstrative aspects, a duration of the STF structure of the mmWave PPDU format may be less than 4 microseconds, e.g., as described below.

In other aspects, the STF structure of the mmWave PPDU format may be configured to have any other suitable duration.

Figure 4:
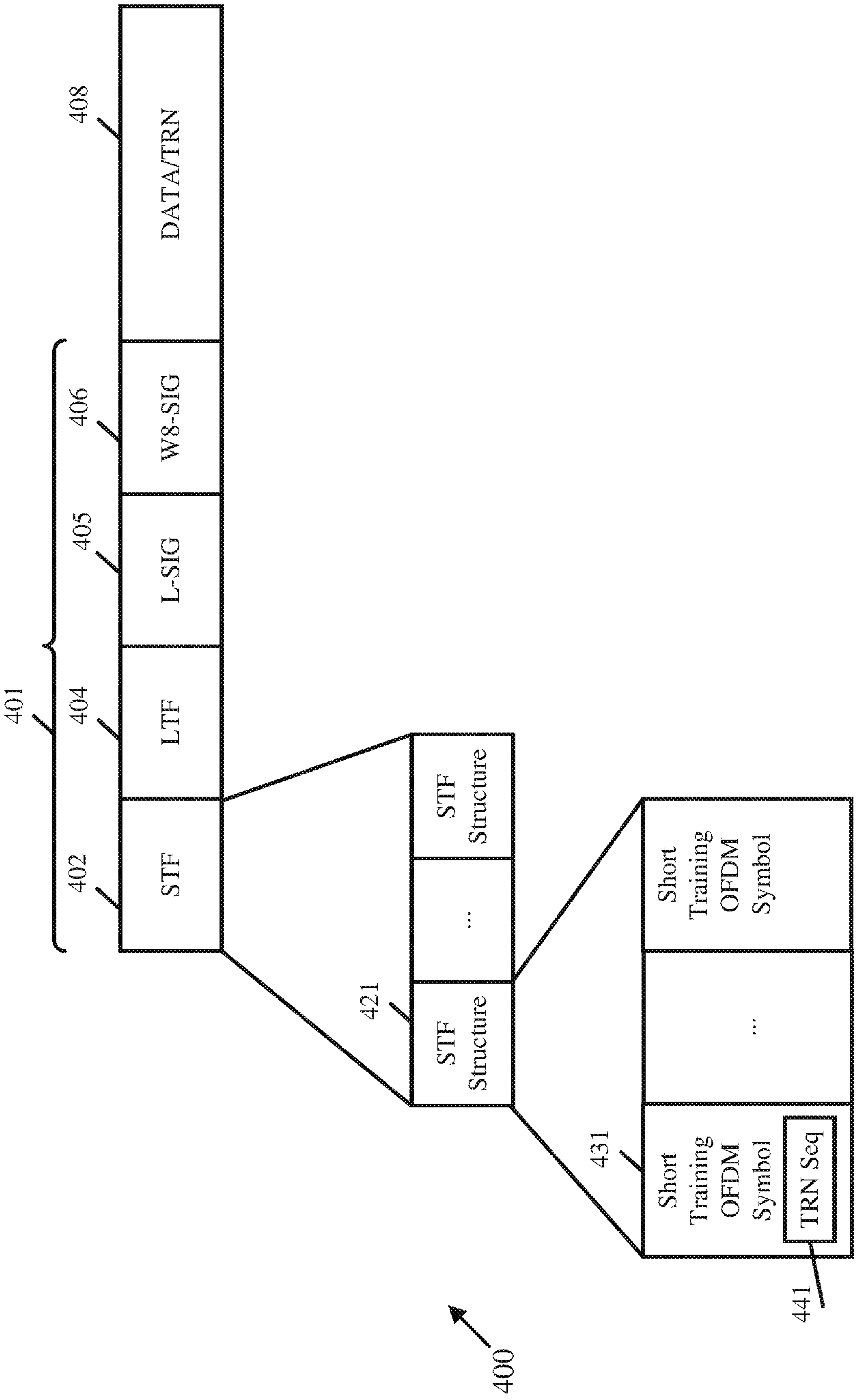
FIG. 4 is a schematic illustration of a millimeterWave (mmWave) Physical layer (PHY) Protocol Data Unit (PPDU) format, in accordance with some demonstrative aspects.

Reference is made to FIG. 4, which schematically illustrates an mmWave PPDU format 400, in accordance with some demonstrative aspects. In one example, device 102 (FIG. 1) and/or device 140 (FIG. 1) may be configured to generate, transmit, receive and/or process one or more mmWave PPDUs having the structure and/or format of mmWave PPDU 400.

In one example, device 102 (FIG. 1) and/or device 140 (FIG. 1) may be configured to communicate mmWave PPDU 400, for example, as part of a transmission over a channel, e.g., an mmWave channel, in an mmWave wireless communication frequency, e.g., as described above.

In some demonstrative aspects, as shown in FIG. 4, mmWave PPDU format 400 may include a preamble portion 401, for example, including an STF 402, e.g., as described below.

In some demonstrative aspects, as shown in FIG. 4, preamble portion 401 may include a Long Training Field (LTF) 404, for example, after STF 402.

In some demonstrative aspects, as shown in FIG. 4, preamble portion 401 may include a Signal (SIG) field 406 (also referred to as "Wi-Fi 8 SIG" or "W8-SIG"), e.g., after LTF 404. For example, the SIG field 406 may be after a non-High Throughput SIG (L-SIG) field 405.

In some demonstrative aspects, as shown in FIG. 4, mmWave PPDU format 400 may include one or more fields 408, for example, a Data field, a Training (TRN) field, and/or any other field, for example, after the SIG field 406.

In some demonstrative aspects, as shown in FIG. 4, STF 402 may include a plurality of repetitions of an STF structure 421, e.g., as described below.

In some demonstrative aspects, as shown in FIG. 4, STF structure 421 may include a plurality of repetitions of a short training OFDM symbol 431, e.g., as described below.

In some demonstrative aspects, as shown in FIG. 4, the short training OFDM symbol 431 may include a training sequence 441 over a plurality of OFDM tones, e.g., as described below.

In some demonstrative aspects, a duration of the STF structure 421 may be less than 5 microseconds, e.g., as described below.

In some demonstrative aspects, a duration of the STF structure 421 may be less than 4 microseconds, e.g., as described below.

In other aspects, STF structure 421 may be configured with any other duration.

In some demonstrative aspects, STF structure 421 may be configured to reuse an L-STF structure, e.g., as described below.

In some demonstrative aspects, STF structure 421 may be compatible with an L-STF structure, e.g., as described below.

In some demonstrative aspects, STF structure 421 may include an L-STF structure, e.g., as described below.

Figure 5:
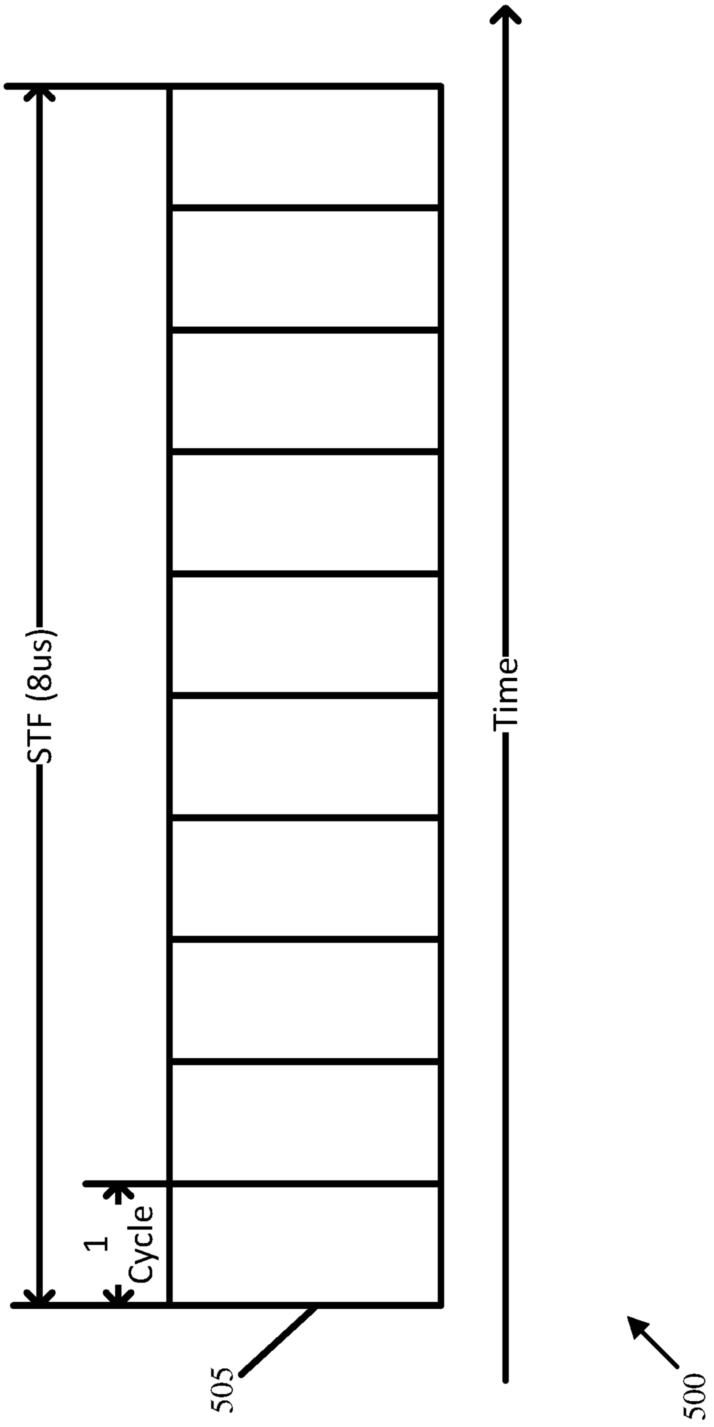
FIG. 5 is a schematic illustration of a Short Training Field (STF) structure, which may be implemented in accordance with some demonstrative aspects.

Reference is made to FIG. 5, which schematically illustrates an STF structure 500, which may be implemented in accordance with some demonstrative aspects. For example, STF structure 421 may be configured to reuse STF structure 500.

In some demonstrative aspects, STF structure 500 may include an L-STF structure, for example, in compliance with an IEEE 802.11 Specification.

In some demonstrative aspects, as shown in FIG. 5, STF structure 500 may include a plurality of repetitions of a plurality of "cycles" 505. For example, a cycle may include a training sequence.

In some demonstrative aspects, as shown in FIG. 5, STF structure 500 may include 10 repetitions of the cycle 505.

In some demonstrative aspects, as shown in FIG. 5, STF structure 500 may have a duration of 8 us.

Referring back to FIG. 4, in some demonstrative aspects, STF 402 may include a frequency domain repetition of the STF structure 421, e.g., as described below.

In some demonstrative aspects, the frequency domain repetition of the STF structure 421 may include two or more repetitions of the STF structure 421, for example, over two or more respective frequency bandwidths, e.g., as described below.

In some demonstrative aspects, a count of repetitions in the two or more repetitions of the STF structure 421 may be based, for example, on a minimal mmWave channel BW, e.g., as described below.

In some demonstrative aspects, a BW of the mmWave wireless communication channel, over which a mmWave PPDU according to the mmWave PPDU format 400 STF is to be communicated, may be equal to or greater than the minimal mmWave channel BW, e.g., as described below.

In some demonstrative aspects, the count of repetitions in the two or more repetitions of the STF structure 421 may be based, for example, on a ratio between the minimal mmWave channel BW and 20 MHz, e.g., as described below.

In some demonstrative aspects, the count of repetitions in the two or more repetitions of the STF structure 421 may be, for example, 8, and the minimal mmWave channel BW may be, for example, 160 MHz, e.g., as described below.

In some demonstrative aspects, the count of repetitions in the two or more repetitions of the STF structure 421 may be, for example, 16, and the minimal mm Wave channel BW may be, for example, 320 MHz, e.g., as described below.

In other aspects, any other additional or alternative count of repetitions in the two or more repetitions of the STF structure 421, and/or any other additional or alternative minimal mmWave channel BW may be implemented.

In some demonstrative aspects, a tone spacing of the short training OFDM symbol 431 may be 312.5 KHz, e.g., as described below. For example, the tone spacing of the short training OFDM symbol 431 may be in compliance with a tone spacing of an OFDM symbol of an L-STF structure, e.g., according to the STF structure 500 (FIG. 5).

In some demonstrative aspects, the short training OFDM symbol 431 may include a training sequence 441 including nonzero energy values populated over OFDM tones having tone indexes which are an integer multiple of 4, and zero energy values over other OFDM tones, e.g., as described below.

In some demonstrative aspects, the short training OFDM symbol 431 may include a training sequence 441 including nonzero energy values populated over OFDM tones having tone indexes which are an integer multiple of 8, and zero energy values over other OFDM tones, e.g., as described below.

In other aspects, the training sequence 441 of the short training OFDM symbol 431 may include non-zero energy values mapped to OFDM tones according to any other tone-mapping scheme.

In some demonstrative aspects, STF structure 421 may be configured to include 10 repetitions of short training OFDM symbol 431, for example, in compliance with the STF structure 500 (FIG. 5), e.g., as described below.

In some demonstrative aspects, STF structure 421 may be configured to include less than 10 repetitions of short training OFDM symbol 431, e.g., as described below.

In some demonstrative aspects, STF structure 421 may be configured to include 5 or less repetitions of short training OFDM symbol 431, e.g., as described below.

In other aspects, STF structure 421 may be configured to include any other suitable count of repetitions of short training OFDM symbol 431.

Figure 6:
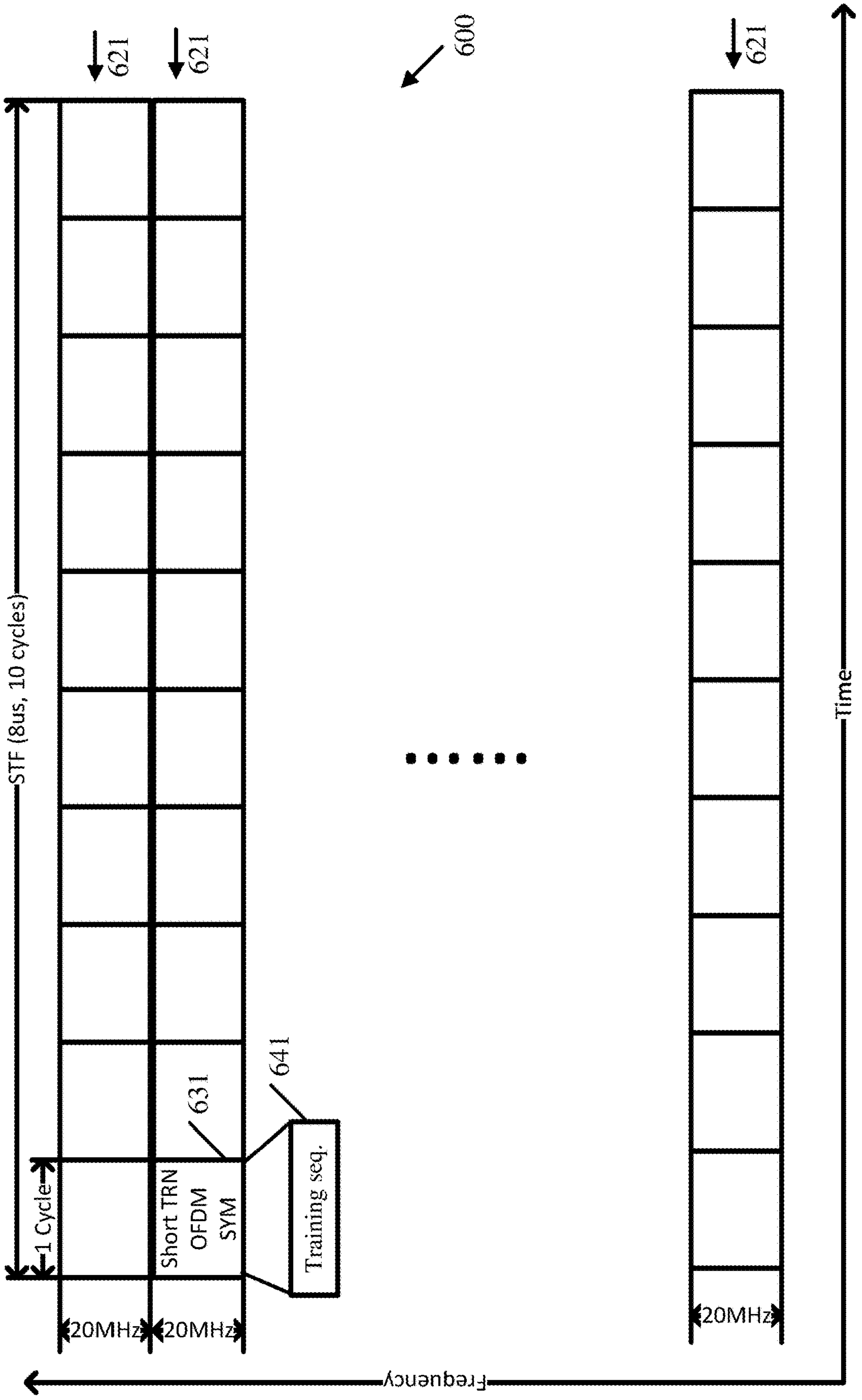
FIG. 6 is a schematic illustration of an STF format including a frequency domain repetition of an STF structure, in accordance with some demonstrative aspects.

Reference is made to FIG. 6, which schematically illustrates an STF format 600 including a frequency domain repetition of an STF structure 621, in accordance with some demonstrative aspects. For example, STF 402 (FIG. 4) may be configured according to the STF format 600. In one example, the STF structure 621 may include the STF structure 421 (FIG. 4).

In some demonstrative aspects, as shown in FIG. 6, STF structure 621 may include a plurality of repetitions of a short training OFDM symbol 631. In one example, the short training OFDM symbol 631 may include short training OFDM symbol 431 (FIG. 4).

In some demonstrative aspects, short training OFDM symbol 631 may include a training sequence 641 over a plurality of OFDM tones, e.g., as described below. For example, the training sequence 641 may include the training sequence 441 (FIG. 4).

In some demonstrative aspects, as shown in FIG. 6, the frequency domain repetition of the STF structure 621 may include two or more repetitions of the STF structure 621, for example, over two or more respective frequency bandwidths, e.g., as described below.

In some demonstrative aspects, STF format 600 may be configured to reuse the STF structure 500 (FIG. 5), e.g., as described below.

In some demonstrative aspects, STF format 600 may be configured to utilize STF structure 621, which may be compatible with an L-STF structure, e.g., as described below.

In some demonstrative aspects, STF format 600 may be configured to utilize STF structure 621, which may include an L-STF structure, for example, the STF structure 500 (FIG. 5), e.g., as described below.

In some demonstrative aspects, as shown in FIG. 6, the STF structure 621 may include 10 repetitions of the short training OFDM symbol 631.

In some demonstrative aspects, as shown in FIG. 6, the STF structure 621 may have a duration of 8 us.

In some demonstrative aspects, a tone spacing of the short training OFDM symbol 631 may be 312.5 KHz. For example, the tone spacing of the short training OFDM symbol 631 may be in compliance with a tone spacing of an OFDM symbol of an L-STF structure, e.g., according to the STF structure 500 (FIG. 5).

In some demonstrative aspects, as shown in FIG. 6, STF format 600 may be configured to include a repetition of the STF structure 621, for example, over every 20 MHz subchannel forming an mmWave channel to communicate an mmWave PPDU.

For example, as shown in FIG. 6, an L-STF structure, e.g., STF structure 500 (FIG. 5), may be used, for example, for every 20 MHz, for example, in case a tone spacing is in compliance with a tone spacing of the L-STF structure.

In some demonstrative aspects, a configuration of STF format 600, for example, a count of repetitions of the STF structure 621, and/or a configuration of the STF structure 621, may be based, for example, on a minimum BW where packet acquisition is to be performed done, e.g., as described below.

In some demonstrative aspects, a count of repetitions in the two or more repetitions of the STF structure 621 may be based, for example, on a minimal mmWave channel BW, e.g., as described below.

In some demonstrative aspects, the count of repetitions in the two or more repetitions of the STF structure 621 may be based, for example, on a ratio between the minimal mmWave channel BW and 20 MHz, for example, when the repetitions of the STF structure 621 are over a plurality of 20 MHz channels, e.g., as shown in FIG. 6.

In some demonstrative aspects, STF format 600 may include 8 repetitions of the STF structure 621, for example, over 16 respective 20 MHz frequency subchannels, for example, when the minimal mmWave channel BW is defined to be 320 MHz, e.g., as described below.

For example, the STF structure 621 may be repeated 16 times in the frequency domain, for example, in case the minimum channel width is 320 MHz for a 60 GHz band. According to this example, a gain of about 12 dB may be achieved on the packet detection performance, e.g., as compared with a performance of a 20 MHz-based packet detection. In one example, the 20 Mhz-based detection may work, for example, at about ~0 dB SNR. According to this example, the frequency domain repetition of the STF structure 621 may have a working point of about ~−12 dB, for example, if packet acquisition is conducted in the 320 MHz minimum channel width.

In some demonstrative aspects, STF format 600 may include 8 repetitions of the STF structure 621, for example, over 8 respective 20 MHz frequency subchannels, for example, when the minimal mmWave channel BW is defined to be 160 MHz, e.g., as described below.

For example, the STF structure 621 may be repeated 8 times in the frequency domain, for example, in case the minimum channel width is 320 MHz for the 60 GHz band. According to this example, a gain of about 9 dB may be achieved on the packet detection performance, e.g., as compared with a performance of a 20 MHz-based packet detection.

In other aspects, any other additional or alternative count of repetitions in the two or more repetitions of the STF structure 621, and/or any other additional or alternative minimal mmWave channel BW may be implemented.

In some demonstrative aspects, as shown in FIG. 6, STF structure 621 may be configured to include 10 repetitions of short training OFDM symbol 631, for example, in compliance with the STF structure 500 (FIG. 5), e.g., as described below.

In some demonstrative aspects, as shown in FIG. 6, STF format 600 may be configured, for example, such that a duration of the STF structure 621 may be, for example, about 8 microseconds, for example, when STF structure 621 includes 10 repetitions of short training OFDM symbol 631, and a duration of the short training OFDM symbol 631 is about 0.8 us.

For example, an STF structure 621 having a duration of about 8 us may be longer, e.g., about twice longer, than a duration of an STF portion of a control mode mmWave transmission, e.g., in accordance with an IEEE 802.11ad/ay Specification.

In some demonstrative aspects, STF format 621 may be configured to have a duration, which may be in compliance with the duration of the STF portion of the control mode mmWave transmission, e.g., in accordance with the IEEE 802.11ad/ay Specification.

In some demonstrative aspects, STF format 600 may be configured, for example, such that a duration of the STF structure 621 may be, for example, less than 5 microseconds, e.g., as described below.

In some demonstrative aspects, STF format 600 may be configured, for example, such that a duration of the STF structure 621 may be, for example, less than 4 microseconds, e.g., as described below.

In other aspects, STF structure 621 may be configured with any other duration.

In some demonstrative aspects, STF structure 621 may be configured to include less than 10 repetitions of short training OFDM symbol 631, e.g., as described below.

In some demonstrative aspects, STF structure 621 may be configured to include 5 or less repetitions of short training OFDM symbol 631, e.g., as described below.

For example, STF structure 621 may be configured to include about half of the number of repetitions of the short training OFDM symbol in STF structure 500 (FIG. 5). For example, STF structure 621 may be configured to include about 5 short training OFDM symbols 631, e.g., corresponding to 5 cycles of the STF structure 500 (FIG. 5).

In some demonstrative aspects, the STF structure 621 having a reduced count of repetitions of the short training OFDM symbol, about 5 repetitions, may be implemented to provide a technical solution to maintain an L-STF sequence, e.g., in compliance with the STF structure 500 (FIG. 5), for example, while trimming down the cycles in the time domain.

In other aspects, STF structure 621 may be configured to include any other suitable count of repetitions of short training OFDM symbol 631.

In some demonstrative aspects, training sequence 641 may be configured to include nonzero energy values populated over OFDM tones having tone indexes which are an integer multiple of 4, and zero energy values over other OFDM tones, e.g., as described below.

In some demonstrative aspects, training sequence 641 may be configured to include nonzero energy values populated over OFDM tones having tone indexes which are an integer multiple of 8, and zero energy values over other OFDM tones, e.g., as described below.

In some demonstrative aspects, training sequence 641 may include a modification of an L-STF training sequence, for example, to achieve a reduced duration, e.g., about half the duration, for each cycle.

In some demonstrative aspects, training sequence 641 may include a new or modified sequence, e.g., a new L-STF sequence, which may include energy values, for example, on every 8th tone. For example, populating the energy on every 8 tone may provide a technical solution utilizing an equivalent tone spacing of 4*312.5 Khz=1.25 Mhz. This equivalent tone spacing may correspond, for example, to a short training OFDM symbol duration of about 0.4 us per cycle.

In some demonstrative aspects, STF structure 621 may be configured to include 10 cycles, e.g., ten repetitions of the short training OFDM symbol 631 utilizing the training sequence 641 with the equivalent tone spacing of 1.25 Mhz. For example, STF structure 621 may have a duration of about 10*0.4=4 us, for example, in compliance with the duration of the STF portion of the control mode mmWave transmission, e.g., in accordance with the IEEE 802.11ad/ay Specification.

In other aspects, the training sequence 641 of the short training OFDM symbol 631 may include non-zero energy values mapped to OFDM tones according to any other tone-mapping scheme.

Figure 7:
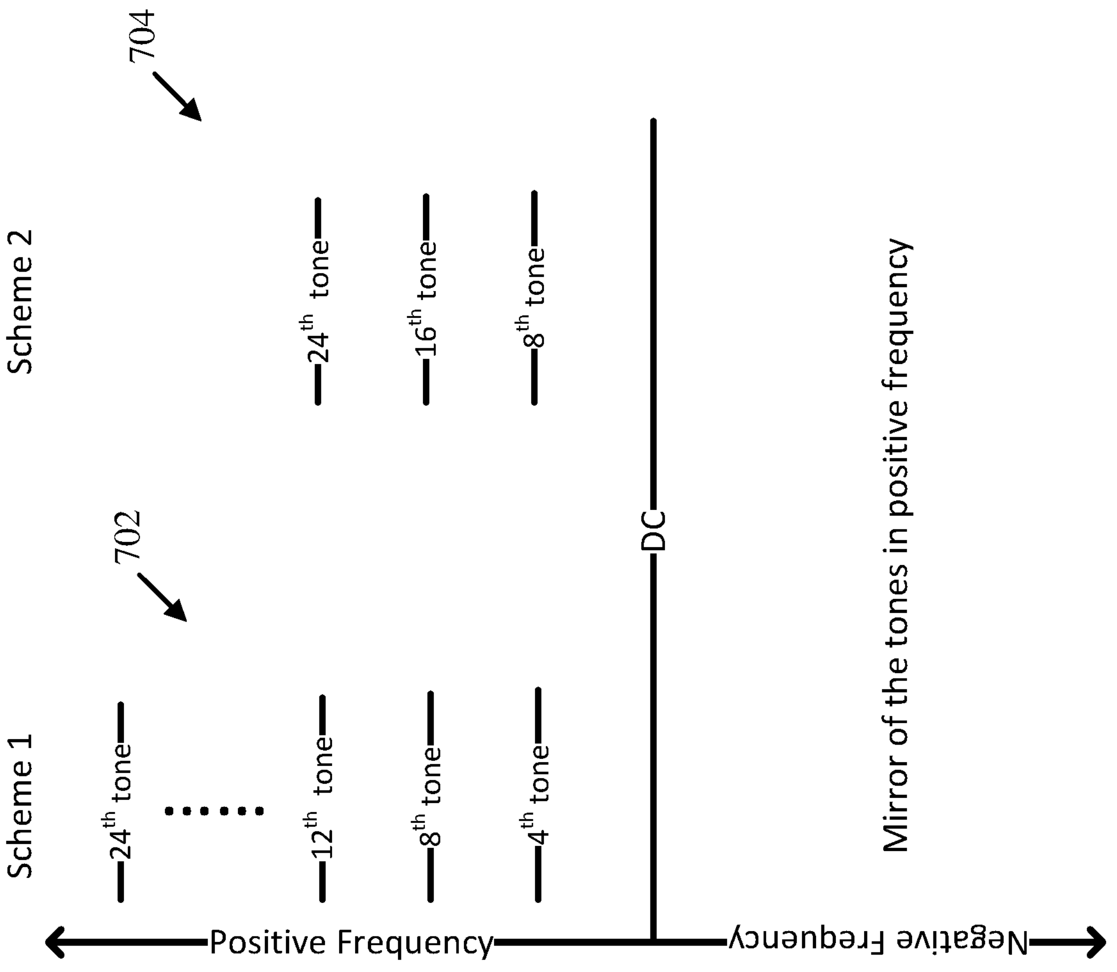
FIG. 7 is a schematic illustration of first and second tone schemes of a short training Orthogonal Frequency Division Multiplexing (OFDM) symbol, in accordance with some demonstrative aspects.

Reference is made to FIG. 7, which schematically illustrates a first tone scheme 702 and a second tone scheme 704 of a short training OFDM symbol, in accordance with some demonstrative aspects.

In one example, training sequence 441 (FIG. 4) of the short training OFDM symbol 431 (FIG. 4) may be configured according to the tone scheme 702.

In another example, training sequence 441 (FIG. 4) of the short training OFDM symbol 431 (FIG. 4) may be configured according to the tone scheme 704.

In one example, training sequence 641 (FIG. 6) of the short training OFDM symbol 631 (FIG. 6) may be configured according to the tone scheme 702.

In another example, training sequence 641 (FIG. 6) of the short training OFDM symbol 631 (FIG. 6) may be configured according to the tone scheme 704.

In some demonstrative aspects, as shown in FIG. 7, the tone scheme 702 may include nonzero energy values populated over OFDM tones having tone indexes which are an integer multiple of 4. In one example, the tone scheme 702 may include nonzero energy values populated over OFDM tones having tone indexes (−24, −20, −16, −12, −8, −4, 4, 8, 12, 16, 20, 24) for a 20 MHz channel width including 52 tones with indexes (−52, −51, . . . , 0, . . . 51, 52). For example, the tone scheme 702 may include zero energy values over other OFDM tones, e.g., over all tones with indexes different than (−24, −20, −16, −12, −8, −4, 4, 8, 12, 16, 20, 24).

For example, the tone scheme 702 may have an equivalent tone spacing of 312.5 Khz.

In some demonstrative aspects, as shown in FIG. 7, the tone scheme 704 may include nonzero energy values populated over OFDM tones having tone indexes which are an integer multiple of 8. In one example, the tone scheme 702 may include nonzero energy values populated over OFDM tones having tone indexes (−24, −16, −8, 8, 24) for a 20 MHz channel width including 52 tones with indexes (−52, −51, . . . , 0, . . . 51, 52). For example, the tone scheme 704 may include zero energy values over other OFDM tones, e.g., over all tones with indexes different than (−24, −16, −8, 8, 24).

For example, the tone scheme 704 may have an equivalent tone spacing of 4*312.5 Khz=1.25 Mhz.

Referring back to FIG. 4, in some demonstrative aspects, STF 402 may include a time domain repetition of the STF structure 421, e.g., as described below.

In some demonstrative aspects, the time domain repetition of the STF structure 421 may include a sequence in time of two or more repetitions of the STF structure 421, e.g., as described below.

In some demonstrative aspects, a tone spacing of the short training OFDM symbol 431, e.g., in the time domain repetition of the STF structure 421, may be configured in compliance with a tone spacing of a data OFDM symbol of a data portion of the mmWave PPDU format 400, e.g., as described below.

In some demonstrative aspects, the tone spacing of the short training OFDM symbol 431, e.g., in the time domain repetition of the STF structure 421, may be configured to be the sane as, e.g., equal to, the tone spacing of a the data OFDM symbol of a data portion 408 of the mmWave PDDU format 400.

In some demonstrative aspects, the short training OFDM symbol 431, e.g., in the time domain repetition of the STF structure 421, may be configured to have a tone spacing of about 2.5 Megahertz (MHz).

In other aspects, the short training OFDM symbol 431 may be configured to have any other suitable tone spacing.

In some demonstrative aspects, the time domain repetition of the STF structure 421 may include, for example at least 4 repetitions of the STF structure 421, e.g., as described below.

In some demonstrative aspects, the time domain repetition of the STF structure 421 may include, for example at least 10 repetitions of the STF structure 421, e.g., as described below.

In other aspects, the time domain repetition of the STF structure 421 may include any other number of repetitions of the STF structure 421.

Figure 8:
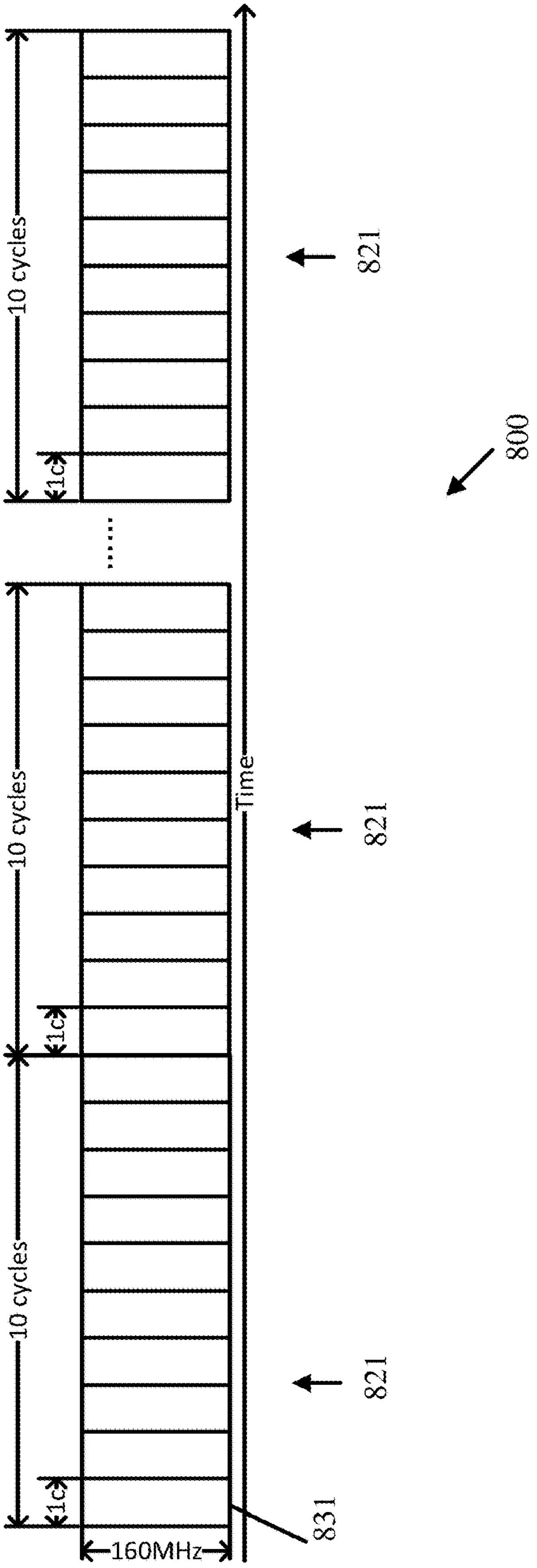
FIG. 8 is a schematic illustration of an STF format including a time domain repetition of an STF structure, in accordance with some demonstrative aspects.

Reference is made to FIG. 8, which schematically illustrates an STF format 800 including a time domain repetition of an STF structure 821, in accordance with some demonstrative aspects. For example, STF 402 (FIG. 4) may be configured according to the STF format 800. In one example, the STF structure 821 may include the STF structure 421 (FIG. 4).

In some demonstrative aspects, as shown in FIG. 8, STF structure 821 may include a plurality of repetitions of a short training OFDM symbol 831. In one example, the short training OFDM symbol 831 may include short training OFDM symbol 431 (FIG. 4).

In some demonstrative aspects, as shown in FIG. 8, STF format 800 may include a sequence in time of two or more repetitions of the STF structure 821.

In some demonstrative aspects, STF structure 821 may be configured with a short training OFDM symbol 831 tone spacing, which may be based on a tone spacing of a data portion of an mmWave PPDU format, e.g., data portion 408 (FIG. 4).

In some demonstrative aspects, STF structure 821 may be configured with a short training OFDM symbol 831 having a same tone spacing of the data portion of the mmWave PPDU format. For example, this structure may be implanted to provide a technical solution to align a tone spacing between a preamble of the mmWave PPDU format and the data portion of the mmWave PPDU format.

In some demonstrative aspects, STF structure 821 may be configured with a short training OFDM symbol 831 having a tone spacing of 2.5 MHz, for example, based on a 2.5 MHz tone spacing of the data portion of the mmWave PPDU format.

In other aspects, short training OFDM symbol 831 may be configured to have any other tone spacing, for example, equal to any other tone spacing of the data portion of the mmWave PPDU format.

In other aspects, short training OFDM symbol 831 may be configured to have any other tone spacing, e.g., different from a tone spacing of the data portion of the mmWave PPDU format.

In some demonstrative aspects, as shown in FIG. 8, a minimum channel width of 160 MHz may be implemented, e.g., instead of 20 MHz, for example, for a short training OFDM symbol 831 having a tone spacing of 2.5 MHz and a tone plan defining nonzero energy values populated over OFDM tones having tone indexes which are an integer multiple of 4, e.g., as described above.

In some demonstrative aspects, a cycle duration, e.g., of a short training OFDM symbol 831, may have a duration of about 0.1 us, for example, based on a 2.5 MHz tone spacing.

In some demonstrative aspects, STF structure 821 may be configured to include 10 cycles, e.g., ten repetitions of the short training OFDM symbol 831 utilizing the tone spacing of 2.5 Mhz. For example, STF structure 821 may have a duration of about 10*0.1=1 us.

In some demonstrative aspects, STF structure 821 may be configured with a minimum repetition granularity of, for example, 10 cycles.

In some demonstrative aspects, a number of time-domain repetitions of the STF structure 821 may be configured, for example, based on requirements of detection performance, overhead and/or any other implementation requirements.

In some demonstrative aspects, for example, STF structure 821 may be configured to include 4 repetitions of the STF structure 821 including 10 cycles with the tone spacing of 2.5 Mhz. Accordingly, the STF structure 821 may include, for example, 40 cycles in total, and may have a duration of about 40*0.1 us=4 us. For example, this implementation may provide a technical solution having an overhead, which may be similar to an overhead of the STF portion of the control mode mmWave transmission, e.g., in accordance with the IEEE 802.11ad/ay Specification.

Referring back to FIG. 4, in some demonstrative aspects, STF 402 may include a combined frequency-time domain repetition of the STF structure 421, e.g., as described below.

In some demonstrative aspects, STF 402 may be configured based on a combination of a frequency domain repetition of the STF structure 421, e.g., as described above with respect to FIG. 6, and a time domain repetition of the STF structure 421, e.g., as described above with respect to FIG. 8.

Figure 9:
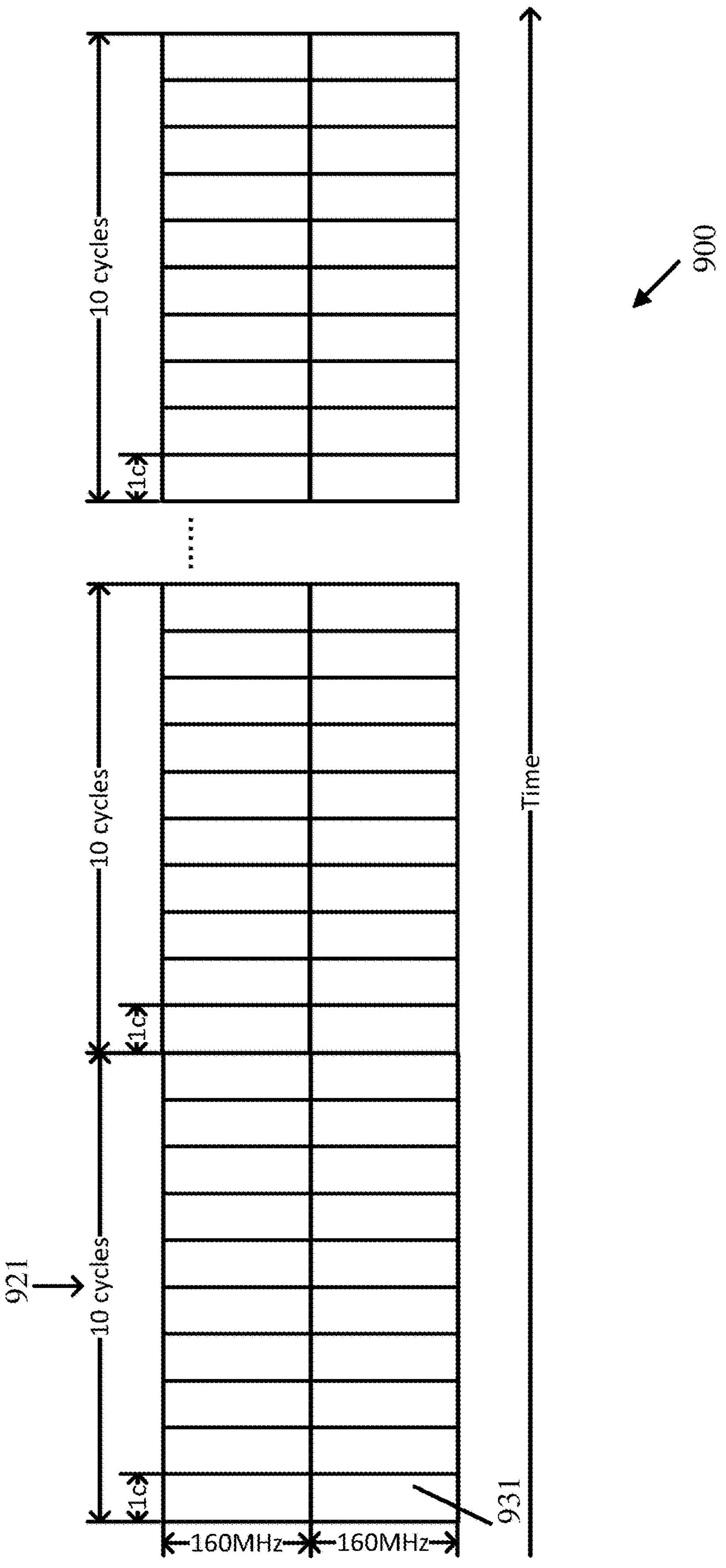
FIG. 9 is a schematic illustration of an STF format including a time-frequency domain repetition of an STF structure, in accordance with some demonstrative aspects.

Reference is made to FIG. 9, which schematically illustrates an STF format 900 including a frequency-time domain repetition of an STF structure 921, in accordance with some demonstrative aspects. For example, STF 402 (FIG. 4) may be configured according to the STF format 900. In one example, the STF structure 921 may include the STF structure 421 (FIG. 4).

In some demonstrative aspects, as shown in FIG. 9, STF structure 921 may include a plurality of repetitions of a short training OFDM symbol 931. In one example, the short training OFDM symbol 931 may include short training OFDM symbol 431 (FIG. 4).

In some demonstrative aspects, STF format 900 may include repetitions of the STF structure 921, for example, in both the time domain and the frequency domain.

In some demonstrative aspects, as shown in FIG. 9, STF format 900 may include two or more repetitions of the STF structure 921, for example, over two or more respective frequency bandwidths, e.g., as described below.

In some demonstrative aspects, as shown in FIG. 9, STF format 900 may include a sequence in time of two or more repetitions of the STF structure 921, e.g., as described below.

In some demonstrative aspects, for example, as shown in FIG. 9, STF format 900 may include a frequency domain repetition of the STF structure 921 in a 320 Mhz channel, for example, wherein two 160 MHz subchannels may be configured as a repetition of each other.

In some demonstrative aspects, for example, as shown in FIG. 9, STF format 900 may include a time domain repetition of the STF structure 921, for example, within each 160 Mhz subchannel.

In one example, the time domain repetition of the STF structure 921 within each 160 MHz subchannel may be based on a 2.5 MHz tone spacing, e.g., as described above.

Figure 10:
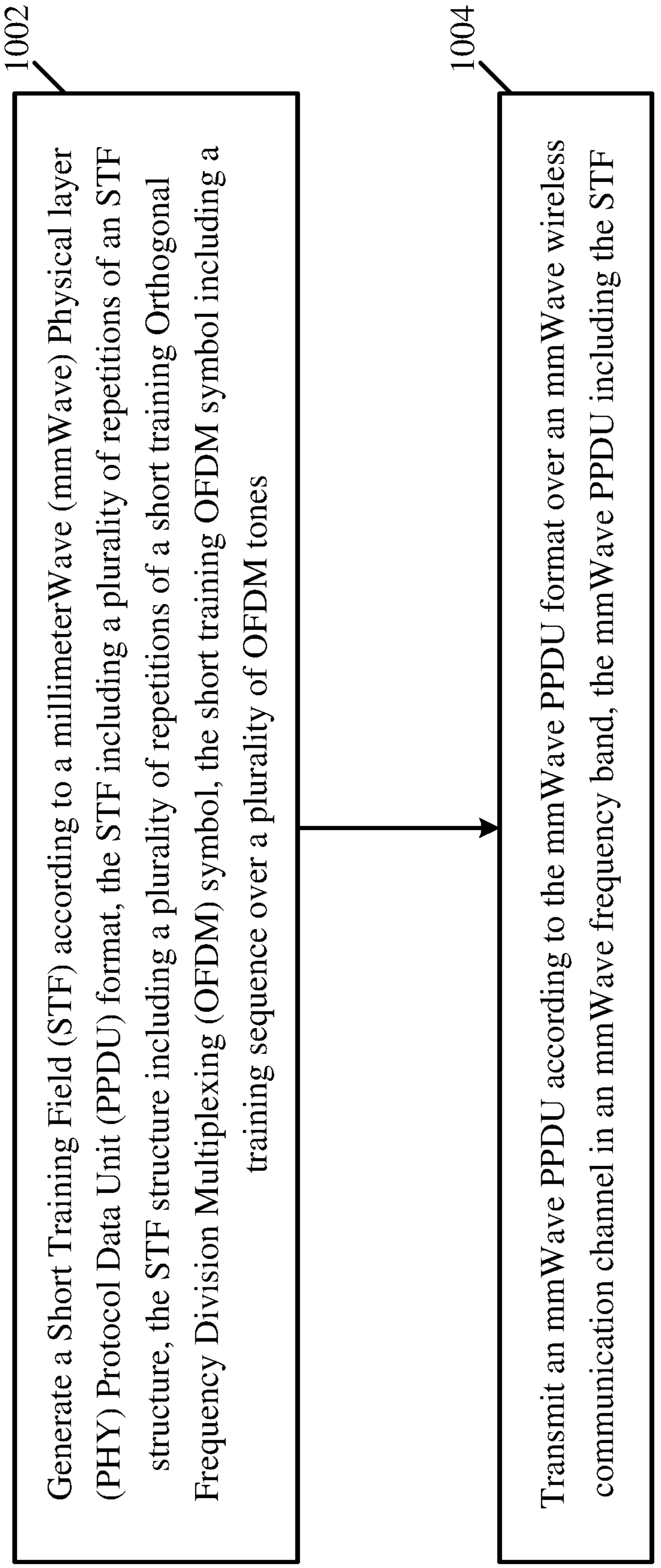
FIG. 10 is a schematic flow-chart illustration of a method of communicating a packet with an STF over an mmWave channel, in accordance with some demonstrative aspects.

Reference is made to FIG. 10, which schematically illustrates a method of communicating a packet with an STF over an mmWave channel, in accordance with some demonstrative aspects. For example, one or more of the operations of the method of FIG. 10 may be performed by one or more elements of a system, e.g., system 100 (FIG. 1), for example, one or more wireless devices, e.g., device 102 (FIG. 1), and/or device 140 (FIG. 1); an mmWave STA, e.g., mmWave STA 141 (FIG. 1) and/or mmWave STA 161 (FIG. 1); an MLD, e.g., MLD 131 (FIG. 1) and/or MLD 151 (FIG. 1); a controller, e.g., controller 124 (FIG. 1) and/or controller 154 (FIG. 1); a radio, e.g., radio 114 (FIG. 1) and/or radio 144 (FIG. 1); and/or a message processor, e.g., message processor 128 (FIG. 1) and/or message processor 158 (FIG. 1).

As indicated at block 1002, the method may include generating an STF according to an mmWave PPDU format. For example, the STF may include a plurality of repetitions of an STF structure. For example, the STF structure may include a plurality of repetitions of a short training OFDM symbol, which may include a training sequence over a plurality of OFDM tones. In one example, controller 124 (FIG. 1) may be configured to cause, trigger, and/or control device 102 (FIG. 1) to generate the STF 402 (FIG. 4) according to the mmWave PPDU format 400 (FIG. 4), e.g., as described above. In another example, controller 154 (FIG. 1) may be configured to cause, trigger, and/or control device 140 (FIG. 1) to generate the STF 402 (FIG. 4) according to the mmWave PPDU format 400 (FIG. 4), e.g., as described above.

As indicated at block 1004, the method may include transmitting an mmWave PPDU according to the mmWave PPDU format over an mmWave wireless communication channel in an mmWave frequency band, the mmWave PPDU including the STF. In one example, controller 124 (FIG. 1) may be configured to cause, trigger, and/or control device 102 (FIG. 1) to transmit the mmWave PPDU including the STA 402 (FIG. 4) according to the mmWave PPDU format 400 (FIG. 4), e.g., as described above. In another example, controller 154 (FIG. 1) may be configured to cause, trigger, and/or control device 140 (FIG. 1) to transmit the mmWave PPDU including the STA 402 (FIG. 4) according to the mmWave PPDU format 400 (FIG. 4), e.g., as described above.

Figure 11:
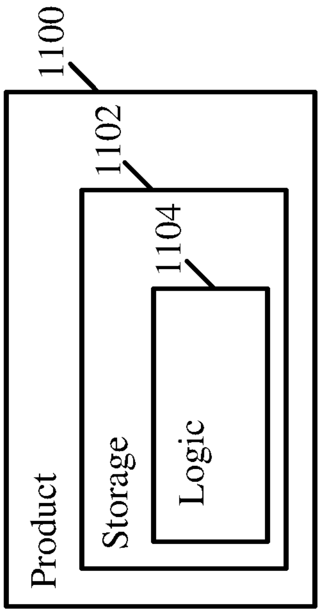
FIG. 11 is a schematic illustration of a product of manufacture, in accordance with some demonstrative aspects.

Reference is made to FIG. 11, which schematically illustrates a product of manufacture 1100, in accordance with some demonstrative aspects. Product 1100 may include one or more tangible computer-readable ("machine-readable") non-transitory storage media 1102, which may include computer-executable instructions, e.g., implemented by logic 1104, operable to, when executed by at least one computer processor, enable the at least one computer processor to implement one or more operations at device 102 (FIG. 1), device 140 (FIG. 1), MLD 131 (FIG. 1), MLD 151 (FIG. 1), mmWave STA 141 (FIG. 1), mmWave STA 161 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1); to cause device 102 (FIG. 1), device 140 (FIG. 1), MLD 131 (FIG. 1), MLD 151 (FIG. 1), mmWave STA 141 (FIG. 1), mmWave STA 161 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities; and/or to perform, trigger and/or implement one or more operations and/or functionalities described with reference to the FIGS. 1, 2, 3, 4, 5, 6, 7, 8, 9, and/or 10, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1100 and/or machine-readable storage media 1102 may include one or more types of computer-readable storage media capable of storing data, including volatile memory, non-volatile memory, removable or non-removable memory, crasable or non-erasable memory, writeable or re-writeable memory, and the like. For example, machine-readable storage media 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a wireless communication device to generate a Short Training Field (STF) according to a millimeterWave (mmWave) Physical layer (PHY) Protocol Data Unit (PPDU) format, the STF comprising a plurality of repetitions of an STF structure, the STF structure comprising a plurality of repetitions of a short training Orthogonal Frequency Division Multiplexing (OFDM) symbol, the short training OFDM symbol comprising a training sequence over a plurality of OFDM tones; and transmit an mmWave PPDU according to the mmWave PPDU format over an mmWave wireless communication channel in an mmWave frequency band, the mmWave PPDU comprising the STF.

Example 2 includes the subject matter of Example 1, and optionally, wherein the STF comprises a frequency domain repetition of the STF structure, the frequency domain repetition of the STF structure comprises two or more repetitions of the STF structure over two or more respective frequency bandwidths.

Example 3 includes the subject matter of Example 2, and optionally, wherein a count of repetitions in the two or more repetitions of the STF structure is based on a minimal mmWave channel bandwidth (BW), wherein a BW of the mmWave wireless communication channel is equal to or greater than the minimal mmWave channel BW.

Example 4 includes the subject matter of Example 3, and optionally, wherein the count of repetitions in the two or more repetitions of the STF structure is based on a ratio between the minimal mmWave channel BW and 20 Megahertz (MHz).

Example 5 includes the subject matter of Example 3 or 4, and optionally, wherein the count of repetitions in the two or more repetitions of the STF structure is 8, and the minimal mmWave channel BW is 160 Megahertz (MHz).

Example 6 includes the subject matter of Example 3 or 4, and optionally, wherein the count of repetitions in the two or more repetitions of the STF structure is 16, and the minimal mmWave channel BW is 320 Megahertz (MHz).

Example 7 includes the subject matter of any one of Examples 2-6, and optionally, wherein a tone spacing of the short training OFDM symbol is 312.5 Kilohertz (KHz).

Example 8 includes the subject matter of any one of Examples 2-7, and optionally, wherein the short training OFDM symbol comprises the training sequence comprising nonzero energy values populated over OFDM tones having tone indexes which are an integer multiple of 4, and zero energy values over other OFDM tones.

Example 9 includes the subject matter of any one of Examples 2-7, and optionally, wherein the short training OFDM symbol comprises the training sequence comprising nonzero energy values populated over OFDM tones having tone indexes which are an integer multiple of 8, and zero energy values over other OFDM tones.

Example 10 includes the subject matter of any one of Examples 2-9, and optionally, wherein a count of repetitions in the plurality of repetitions of the short training OFDM symbol is less than 10.

Example 11 includes the subject matter of any one of 2-9, and optionally, wherein a count of repetitions in the plurality of repetitions of the short training OFDM symbol is 5 or less.

Example 12 includes the subject matter of any one of Examples 2-9, and optionally, wherein a count of repetitions in the plurality of repetitions of the short training OFDM symbol is 10.

Example 13 includes the subject matter of any one of Examples 1-12, and optionally, wherein the STF comprises a time domain repetition of the STF structure, wherein the time domain repetition of the STF structure comprises a sequence in time of two or more repetitions of the STF structure.

Example 14 includes the subject matter of Example 13, and optionally, wherein a tone spacing of the short training OFDM symbol is equal to a tone spacing of a data OFDM symbol of a data portion of the mmWave PDDU.

Example 15 includes the subject matter of Example 13 or 14, and optionally, wherein a tone spacing of the short training OFDM symbol is 2.5 Megahertz (MHz).

Example 16 includes the subject matter of any one of Examples 13-15, and optionally, wherein a count of repetitions in the two or more repetitions of the STF structure is at least 4.

Example 17 includes the subject matter of any one of Examples 13-16, and optionally, wherein a count of repetitions in the plurality of repetitions of the short training OFDM symbol is at least 10.

Example 18 includes the subject matter of any one of Examples 1-17, and optionally, wherein the STF structure comprises a non High-Throughput (non-HT) STF (L-STF) structure.

Example 19 includes the subject matter of any one of Examples 1-18, and optionally, wherein a duration of the STF structure is less than 5 microseconds.

Example 20 includes the subject matter of any one of Examples 1-19, and optionally, wherein a duration of the STF structure is no more than 4 microseconds.

Example 21 includes the subject matter of any one of Examples 1-20, and optionally, wherein a bandwidth (BW) of the mmWave wireless communication channel is equal to or greater than a minimal mmWave channel BW of at least 160 Megahertz (MHz).

Example 22 includes the subject matter of any one of Examples 1-21, and optionally, wherein the mmWave frequency band is above 45 Gigahertz (GHz).

Example 23 includes the subject matter of any one of Examples 1-22, and optionally, comprising at least one radio to transmit the mmWave PPDU.

Example 24 includes the subject matter of Example 23, and optionally, comprising one or more antennas connected to the radio, and a processor to execute instructions of an operating system of the wireless communication device.

Example 25 comprises a wireless communication device comprising the apparatus of any of Examples 1-24.

Example 26 comprises an apparatus comprising means for executing any of the described operations of any of Examples 1-24.

Example 27 comprises a product comprising one or more tangible computer-readable non-transitory storage media comprising instructions operable to, when executed by at least one processor, enable the at least one processor to cause a wireless communication device to perform any of the described operations of any of Examples 1-24.

Example 28 comprises an apparatus comprising: a memory interface; and processing circuitry configured to: perform any of the described operations of any of Examples 1-24.

Example 29 comprises a method comprising any of the described operations of any of Examples 1-24.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:

generate a Short Training Field (STF) according to a millimeterWave (mmWave) Physical layer (PHY) Protocol Data Unit (PPDU) format, the STF comprising a plurality of repetitions of an STF structure, the STF structure comprising a plurality of repetitions of a short training Orthogonal Frequency Division Multiplexing (OFDM) symbol, the short training OFDM symbol comprising a training sequence over a plurality of OFDM tones; and transmit an mmWave PPDU according to the mmWave PPDU format over an mmWave wireless communication channel in an mmWave frequency band, the mmWave PPDU comprising the STF.

2. The apparatus of claim 1, wherein the STF comprises a frequency domain repetition of the STF structure, the frequency domain repetition of the STF structure comprises two or more repetitions of the STF structure over two or more respective frequency bandwidths.

3. The apparatus of claim 2, wherein a count of repetitions in the two or more repetitions of the STF structure is based on a minimal mmWave channel bandwidth (BW), wherein a BW of the mm Wave wireless communication channel is equal to or greater than the minimal mmWave channel BW.

4. The apparatus of claim 3, wherein the count of repetitions in the two or more repetitions of the STF structure is based on a ratio between the minimal mmWave channel BW and 20 Megahertz (MHz).

5. The apparatus of claim 3, wherein the count of repetitions in the two or more repetitions of the STF structure is 8, and the minimal mmWave channel BW is 160 Megahertz (MHz).

6. The apparatus of claim 3, wherein the count of repetitions in the two or more repetitions of the STF structure is 16, and the minimal mmWave channel BW is 320 Megahertz (MHz).

7. The apparatus of claim 2, wherein a tone spacing of the short training OFDM symbol is 312.5 Kilohertz (KHz).

8. The apparatus of claim 2, wherein the short training OFDM symbol comprises the training sequence comprising nonzero energy values populated over OFDM tones having tone indexes which are an integer multiple of 4, and zero energy values over other OFDM tones.

9. The apparatus of claim 2, wherein the short training OFDM symbol comprises the training sequence comprising nonzero energy values populated over OFDM tones having tone indexes which are an integer multiple of 8, and zero energy values over other OFDM tones.

10. The apparatus of claim 2, wherein a count of repetitions in the plurality of repetitions of the short training OFDM symbol is 5 or less.

11. The apparatus of claim 1, wherein the STF comprises a time domain repetition of the STF structure, wherein the time domain repetition of the STF structure comprises a sequence in time of two or more repetitions of the STF structure.

12. The apparatus of claim 11, wherein a tone spacing of the short training OFDM symbol is equal to a tone spacing of a data OFDM symbol of a data portion of the mmWave PPDU.

13. The apparatus of claim 11, wherein a tone spacing of the short training OFDM symbol is 2.5 Megahertz (MHz).

14. The apparatus of claim 11, wherein a count of repetitions in the two or more repetitions of the STF structure is at least 4.

15. The apparatus of claim 1, wherein a count of repetitions in the plurality of repetitions of the short training OFDM symbol is at least 10.

16. The apparatus of claim 1, wherein a duration of the STF structure is no more than 4 microseconds.

17. The apparatus of claim 1, wherein a bandwidth (BW) of the mmWave wireless communication channel is equal to or greater than a minimal mmWave channel BW of at least 160 Megahertz (MHz).

18. The apparatus of claim 1 comprising at least one radio to transmit the mmWave PPDU, one or more antennas connected to the radio, and a processor to execute instructions of an operating system of the wireless communication device.

19. A product comprising one or more tangible computer-readable non-transitory storage media comprising instructions operable to, when executed by at least one processor, enable the at least one processor to cause a wireless communication device to:

generate a Short Training Field (STF) according to a millimeterWave (mmWave) Physical layer (PHY) Protocol Data Unit (PPDU) format, the STF comprising a plurality of repetitions of an STF structure, the STF structure comprising a plurality of repetitions of a short training Orthogonal Frequency Division Multiplexing (OFDM) symbol, the short training OFDM symbol comprising a training sequence over a plurality of OFDM tones; and transmit an mmWave PPDU according to the mmWave PPDU format over an mmWave wireless communication channel in an mmWave frequency band, the mmWave PPDU comprising the STF.

20. The product of claim 19, wherein a duration of the STF structure is no more than 4 microseconds.

* * * * *